L. G. GRABE.
ATTACHMENT FOR WASHBOILERS AND THE LIKE.
APPLICATION FILED MAR. 25, 1916.
1,189,809.
Patented July 4, 1916.
3 SHEETS—SHEET 1.
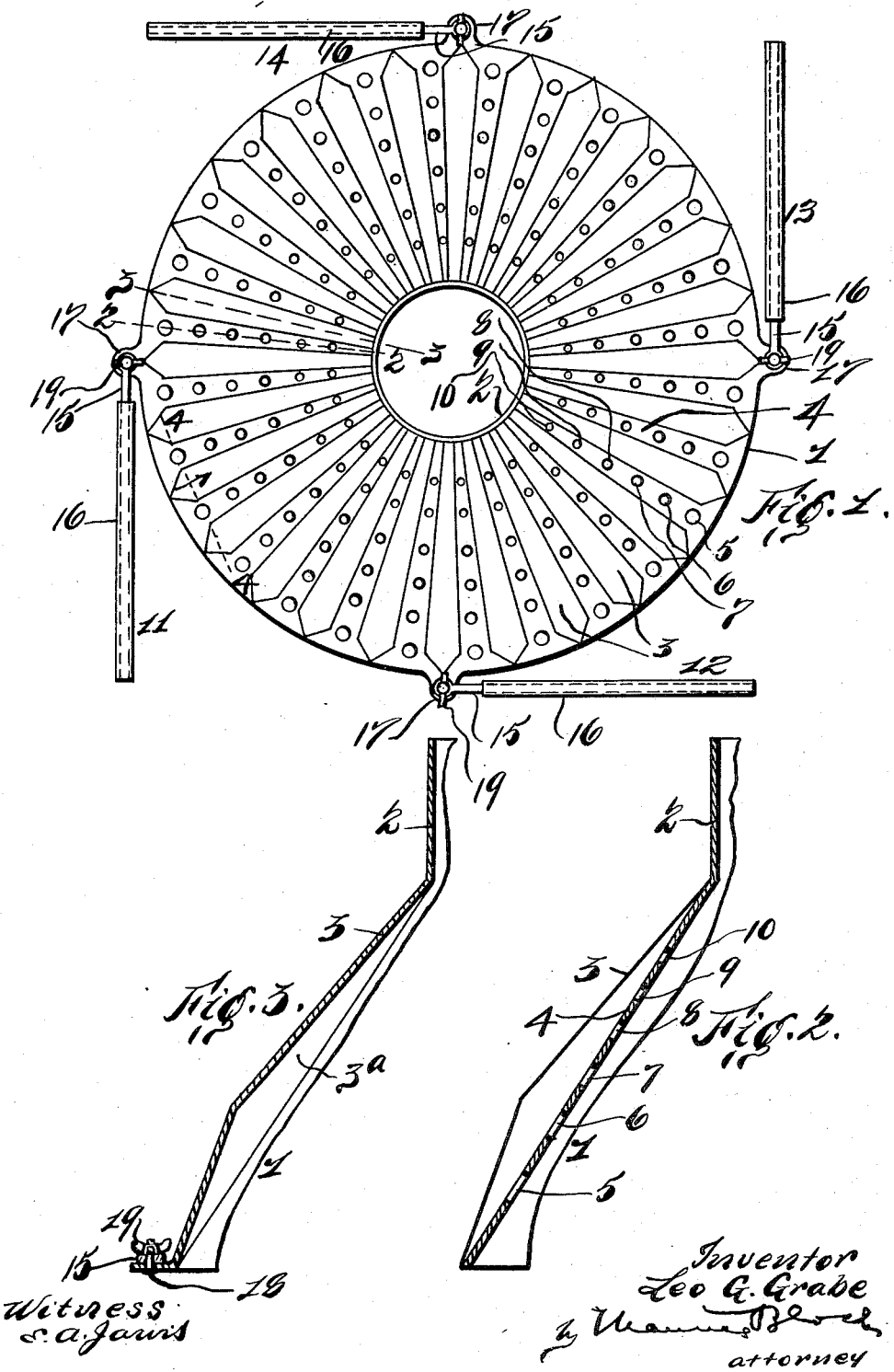
Witness
S. A. Jarvis
Inventor
Leo G. Grabe
attorney

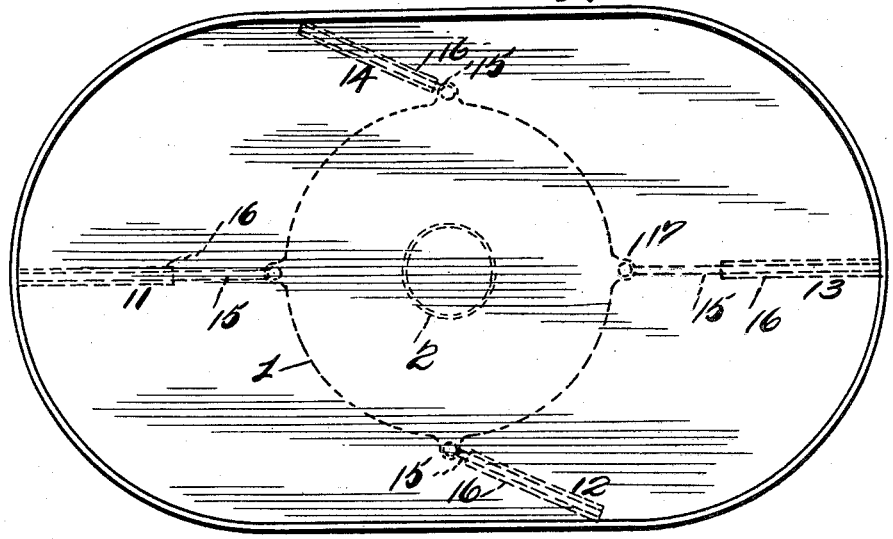
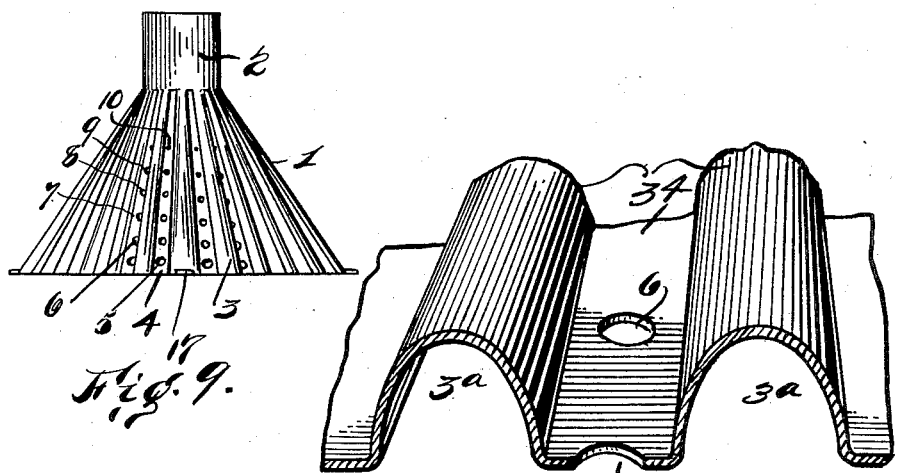

L. G. GRABE.
ATTACHMENT FOR WASHBOILERS AND THE LIKE.
APPLICATION FILED MAR. 25, 1916.
1,189,809.
Patented July 4, 1916.
3 SHEETS—SHEET 3.
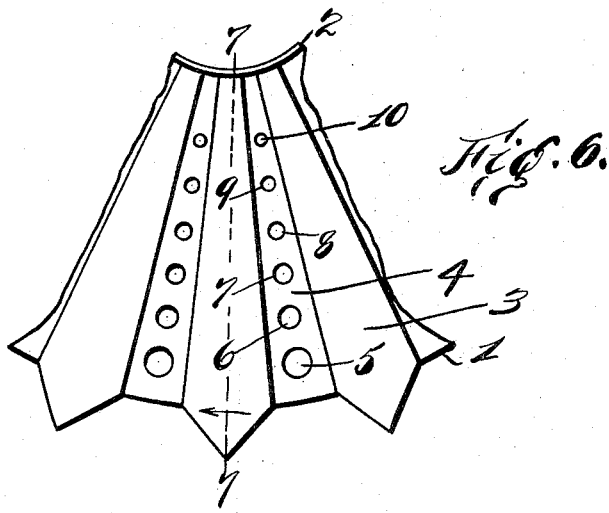
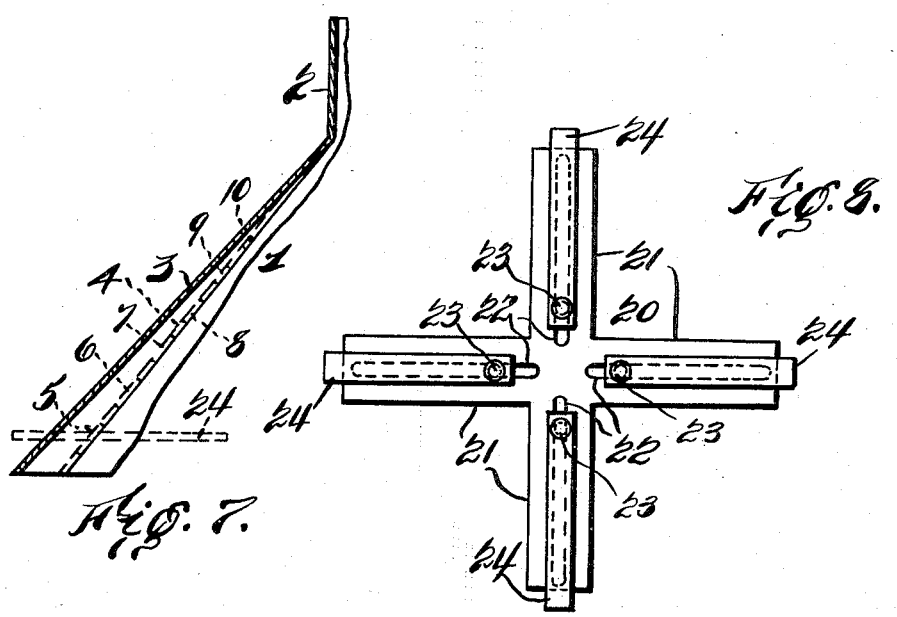
Witness
E. A. Jams
Inventor
Leo G. Grabe
by Nennus Block
attorney

UNITED STATES PATENT OFFICE.

LEO G. GRABE, OF ST. GEORGE, NEW YORK.

ATTACHMENT FOR WASHBOILERS AND THE LIKE.

1,189,809.  Specification of Letters Patent.  Patented July 4, 1916.

Application filed March 25, 1916. Serial No. 86,570.

*To all whom it may concern:*

Be it known that I, LEO G. GRABE, a citizen of the United States of America, residing at St. George, Richmond county, and State of New York, have invented certain new and useful Improvements in Attachments for Washboilers and the like, of which the following is a full, clear, and exact description.

This invention relates to improvements in devices for causing the water within washboilers or cooking utensils to circulate more rapidly than is usual in the ordinary act of boiling and thus insuring more thorough washing or cooking effect.

My improved device depends for its operation upon the action of boiling water, the agitated boiling water entering the device and at the same time injecting air thereinto that will commingle with the water, the water and injected air flowing to a chamber in the top of the circulating device, from which it will be discharged under pressure. The inflow and discharge of the air and water will cause a violent circulation, the agitation increasing with the violence of boiling.

For washing clothes my improved device will be found very effective, as the rapid circulation of the water, caused by my improved device, will produce a large amount of suds and will also more thoroughly cleanse the clothes. For cooking, my improved device will be found very efficient, as its use will cause the boiling water to circulate rapidly through the articles that are being cooked.

My improved device is placed within the washing or cooking utensils and is preferably submerged, special means being provided to center the device relative to the vessel within which it is placed if desirable.

I will now proceed to describe my invention in detail, the essential features of which will be summarized in the appended claims, reference being had to the accompanying drawings, forming part hereof, wherein:

Figure 1 is a top plan view of one form of my improved device; Figs. 2 and 3 are vertical sectional detail views, the sections being taken respectively on the lines 2—2 and 3—3 in Fig. 1; Fig. 4 is a cross sectional view on the line 4—4 in Fig. 1; Fig. 5 is a diagrammatic plan view of a wash-boiler, showing in dotted lines my improved device submerged therein; Fig. 6 is a fragmentary plan view showing another arrangement of the corrugations in my improved device; Fig. 7 is a sectional view thereof, the section being taken on a line 7—7 in Fig. 6; Fig. 8 illustrates another form of centering means for my improved device; and Fig. 9 is a side elevation, on a reduced scale, of my improved device.

My improved washer or agitating device as herein illustrated consists of a conical body portion 1 finished off at the top into a chamber 2 communicating with the interior of the conical body portion 1. To carry out the object of my invention, I preferably corrugate the conical body portion 1, as at 3, the corrugations being spaced apart to provide substantially flat surfaces 4 which are perforated as at 5, 6, 7, 8, 9 and 10, the said perforations being of varying sizes, starting with the relative large openings 5, the remaining openings being of gradually decreasing diameter. Each surface 4 is provided with the progressively larger perforations as shown.

The water poured into the boiler will enter the cone 1, through the openings 5 to 10, inclusive, and pass thence upwardly into the chamber 2. As the temperature of the water increases, the circulation through the openings 5 to 10 will increase. The weight of the water in the boiler will prevent steam and water from passing outwardly from the interior of the cone through the openings 5 to 10, and hence the steam will take the course of least resistance, which will be through the chamber 2.

The corrugations 3 provide a plurality of small interior channels $3^a$ for the upward passage of the steam, at the same time acting to clean clothes in the manner of a wash-board, the clothes rubbing in contact with the corrugations by the action of the rapidly circulating water. Furthermore, the spaces 4 between the corrugations provide channels or passages for the circulation of water and steam should the clothes being washed closely envelop the device. If the corrugations or ribs were not provided and the clothes should gather closely around or against the exterior of such device, the openings 5, etc., would become clogged and the utility of the device greatly diminished. I do not wish to limit myself to any particular form of corrugations, that is to say to any particular way of finishing them off at the bottom of the body portion, as they can be finished off as shown in Figs. 2 and 3, or as shown in Figs. 6 and 7; in both instances they do not destroy the effect of the channels, provided by forming the said corrugations, within the body portion, nor is the particular shape of the corrugations important, as they may be curved or angular.

In combination with the agitating device, I provide centering elements which can be attached thereto at will, one form of centering device comprising arms 11, 12, 13 and 14, Fig. 1 consisting of the telescoping members 15 and 16. The arms 11 to 14 inclusive can be pivotally attached to ears 17 on the body portion 1, by means of a bolt 18 and wing-nut 19 at any time when it is desirable to retain the device in the center of a washing or cooking utensil as shown in Fig. 1. To adjust the length of the arms the tubular member 16 can be moved longitudinally of the rod 15 the required distance. The pivoting of the arms allows their movement in a horizontal plane obliquely toward or from the boiler wall; and said bolts and nuts will clamp said arms in any one of the various angular positions thus assumed, the nuts being turned to tighten them and the bolts for that purpose.

Instead of employing adjustable arms for the centering device, I may place a spider 20 (Fig. 8) in the bottom of the body portion 1, the arms 21 of the said spider being provided with slots 22 to be slidably engaged by a rivet 23 carried by adjustable arms 21. The rivet 23 will be set up tight enough to prevent a loose fit, but not enough to prevent the arms 21 from being moved. The arms 24 can pass through certain of the openings 5, as shown by dotted lines in Fig. 7.

As the arms of my centering mechanism are extensible, my device may be used and adjusted to fit boilers or kettles of different sizes.

Whenever in the foregoing specification and appended claims, I employ the term "washing-device," I wish it understood that the same is also intended to include cooking utensils for boiling vegetables, foods or any vessel where increased circulation of boiling water is desired.

Having now described my invention, what I claim and desire to secure by Letters Patent is:

1. A conoidal hollow circulating device for wash-boilers provided at intervals with corrugations extending down its inclined sides, also with perforations in the spaces between such corrugations, these perforations being arranged in straight series parallel to such corrugations substantially as shown.

2. A conoidal hollow circulating device for wash-boilers having a cylindrical part at its top and provided with corrugations extending at intervals down its inclined sides, also with perforations in the spaces between such corrugations, these perforations being arranged in straight series parallel to such corrugations substantially as shown.

Signed at New York city, N. Y., this 24th day of March, 1916.

LEO G. GRABE.

Witnesses:
EDWARD A. JARVIS,
MAURICE BLOCK.

Copies of this patent may be obtained for five cents each, by addressing the "Commissioner of Patents, Washington, D. C."